United States Patent Office 3,367,924
Patented Feb. 6, 1968

3,367,924
POLYMERIZATION OF BICYCLO[2.2.1]-HEPT-2-ENE COMPOUNDS IN AQUEOUS EMULSION
Robert E. Rinehart, Rutherford, N.J., assignor to Uniroyal, Inc., a corporation of New Jersey
No Drawing. Filed Mar. 9, 1964, Ser. No. 350,589
12 Claims. (Cl. 260—89.3)

ABSTRACT OF THE DISCLOSURE

Olefinically unsaturated compounds containing a bicyclo [2.2.1]-hept-2-ene ring system, such as 5-carbomethoxy-norbornene, trans-dimethyl bicyclo[2.2.1]-hept-5-ene-2,3-dicarboxylate, halogenated norbornenes and norbornene itself, are polymerized, preferably in aqueous emulsion, with a catalyst based on an iridium or ruthenium compound (e.g., iridium trichloride) and a reducing agent (e.g., an alcohol, aldehyde, zinc, stannous chloride).

This invention relates to a method of polymerizing olefinically unsaturated organic compounds, containing at least one carbon-carbon double bond in a bicyclo[2.2.1]-hept-2-ene ring system, with a compound of iridium or ruthenium as the "catalyst," in conjunction with an organic or inorganic reducing agent of sufficient reducing strength to activate the so-called "catalyst," and an emulsifying agent. An important aspect of the invention is the use of the emulsifying agent, resulting in improved properties and increased yields of the polymer when prepared in an aqueous solution.

Norbornene (bicyclo[2.2.1]-hept-2-ene) has been polymerized by Ziegler catalysts.[1] Depending on the catalyst composition, the polymer either is saturated, or contains significant amounts of trans-unsaturation. My method differs considerably from the Ziegler method in that my method can be carried out in water, alcohols and other polar solvents which would lead to destruction of a Ziegler catalyst. Also, my method can be used for monomers containing polar groups which would destroy the Ziegler catalyst.

Salts of iridium and ruthenium have been used in emulsion polymerization of butadiene.[2]

The polymerization of norbornene in alcohol using salts of iridium, ruthenium and osmium has been reported in the past.[3] This method leads to a polymer containing large amounts of trans-unsaturation. My method differs from the Michelotti et al. method in that my method is carried out in an aqueous solution because of the unique combination of reducing agent and emulsifying agent present in the emulsion with the monomer and catalyst.

The norbornene monomers to be used in my method are conveniently formed by the addition of cyclopentadiene to an olefin, to form the desired bicyclo-[2.2.1]-hept-2-ene structure.

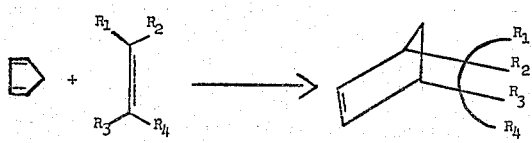

The monomers include: (a) monosubstituted norbornenes such as 5-carbomethoxy-norbornene, 5-phenyl-2-norbornene, 2-norbornene-5-carboxylic acid and 2-hydroxymethyl-5-norbornene; (b) disubstituted norbornenes such as oxo-dicyclopentadiene, 5 - methyl-5-carbomethoxy-2-norbornene, trans-dimethyl bicyclo[2.2.1]-hept-5-ene-2,3-dicarboxylate, and exo-dihydrodicyclopentadiene; (c) halogenated norbornenes such as trans-5,6-dichlorobicyclo-[2.2.1]hept - 2 - ene and endo - cis - 5,6 - dichlorobicyclo[2.2.1] - hept - 2 - ene; and (d) norbornene. Certain groups such as nitrilo, nitro, amino, amido, hydrazino and hydrazido are not suitable substituents in the monomers used in this invention because such groups form strong complexes with the so-called "catalyst," thus leading to a greatly decreased yield of polymer. In like manner, bicyclo[2.2.1] - hepta - 2,5 - diene and endo-dicyclopentadiene are not suitable monomers because of the tendency of these two dienes to form strong complexes with the catalysts. Neither exo-dicyclopentadiene nor dihydrodicyclopentadiene exhibits the tendency to form complexes, and both can be polymerized by the method of this invention to high molecular weight polymers exhibiting useful properties.

Halide salts of iridium and ruthenium have been found to effect the polymerization of certain cyclic olefins, including mono- and diolefins in which at least one unsaturated carbon-carbon double bond is contained in a bicyclo [2.2.1]-hept-2-ene ring system, to high molecular weight polymers containing significant amounts of unsaturation in the polymer chain. Examples of the halide salts of iridium and ruthenium employed for this purpose are iridium trichloride, iridium tribromide, ruthenium trichloride, dipotassium iridium hexachloride, and diammonium iridium hexachloride.

In this polymerization method a reducing agent is necessary for the reaction to proceed. The reducing agent may be either organic or inorganic. Those which have been found to be effective include: aliphatic alcohols of two or more carbon atoms, e.g. ethanol; aldehydes, e.g. butyraldehyde; free metals between and including tin and magnesium as listed in the electromotive force table set forth in Lange's Handbook of Chemistry; sodium borohydride; and stannous salts. The reducing agent must be powerful enough to convert the so-called "catalyst" to the proper oxidation state but must not be so strong as to cause reduction to free metal. The molar ratio of the reducing agent to catalyst must be equal to or greater than one.

This invention also permits the polymerization of substituted norbornene compounds by use of an emulsifier in an aqueous mixture of monomer, catalyst and proper reducing agent. Either an anionic, or a non-ionic emulsifier such as Pluronic F-68 (polyoxyethylene-polyoxypropylene glycol in which the polyoxypropylene chain has a molecular weight from 1500 to 1800 and the polyoxyethylene content is from 80 to 90 percent by weight of the total molecule), may be used. Examples of anionic emulsifiers are alkarylsulfonates such as sodium dodecylbenzenesulfonate, and alkyl sulfates such as sodium lauryl sulfate. Certain emulsifiers, such as polyepoxides (of which Pluronic F-68 is an example) contain reducing groups, i.e. the hydroxy end group of polyepoxides, and have utility both as emulsifier and as reducing agent. However, in the case of Pluronic F-68, the reducing strength of the compound is very slight and additional reducing agent must be added to the reaction.

Properties of the molded end-product polymer include good optical clarity, high hardness and impact strength, and good tensile strength. The polymer is moldable, may be milled and may be used for structural purposes.

The following examples illustrate the invention.

[1] W. L. Truett et al., J. Am. Chem. Soc., 82, 2337 (1960). I. M. Robinson & W. L. Truett, U.S. #2,9392,630 (to du Pont).
[2] A. J. Canale et al., Chem. & Ind. 1054 (1962). A. J. Canale et al., Belgium #604,9903.
[3] F. W. Michelotti and W. P. Keaveney, ACS Polymer Preprints, vol. 4, #2, p. 293, September 1963.

Example 1

This example illustrates the preparation of a hard, tough, thermoplastic material from norbornene.

The following recipes were mixed in carbonated beverage bottles. The bottles were sealed, and agitated on a 50° bath for the hours specified.

|  | A | B | C |
|---|---|---|---|
| IrCl₃.4H₂O, g | 0.01 | 0.1 | 0.25 |
| Norbornene, g | 50 | 50 | 50 |
| H₂O, ml | 50 | 50 | 50 |
| EtOH, ml | 150 | 150 | 156 |
| Reaction time, hours | 21.2 | 21.6 | 21.0 |
| Polymer yield, g | 5.7 | 44.2 | 47.5 |

The polymers were removed by filtration and were washed several times with methanol containing small amounts of N-phenyl-beta-naphthylamine. The polymers were dried at room temperature under vacuum for several days, then heated at 60° C. under vacuum. The dry weights are shown in the table.

Samples B and C were molded at 425° C. to give hard, tough thermoplastic materials exhibiting the following physical properties.

|  | B | C |
|---|---|---|
| Tensile strength at 74° F | 3,005 | 3,040 |
| Torsional modulus, room temp | 199,900 | 207,300 |
| Hardness—Rockwell R | 84 | 69 |
| Notched izod impact (duplicates) | 5.9 | 8.2 |
|  | 1.7 | 5.6 |

Example 2

This example shows the preparation of a tough transparent film from 5-carbomethoxy-2-norbornene (methyl bicyclo-[2.2.1]-hept-2-ene-5-carboxylate).

The following recipe was mixed in a glass tube which was then sealed. The tube was agitated on a 50° bath for 23.8 hours.

IrCl₃.4H₂O ------------------------------g-- 0.1
5-carbomethoxynorbornene ----------------g-- 2
H₂O -----------------------------------ml-- 3
EtOH ----------------------------------ml-- 20

The polymer was removed by filtration, washed several times in methanol containing a small amount of N-phenyl-beta-naphthylamine. The polymer was dried under vacuum at room temperature. Dry weight 0.34 gm.

The dry polymer was pressed at 425° F. into a film of average thickness .008". The film, when cool, showed great strength and could be flexed many times without breaking.

Example 3

This example illustrates the preparation of high molecular weight polymers of norbornene and 5-carbomethoxy-norbornene in emulsion. The use of SnCl₂ and, also, of ethanol as reducing agents is illustrated. A control experiment of attempted polymerization without the reducing agent is included.

The following recipes were made up in tubes which were then capped. The tubes were agitated on a 50° bath for the hours specified. The polymers were precipitated by pouring the emulsion into methanol containing small amounts of N-phenyl-beta-naphthylamine. The polymer was removed by filtration, washed several times with more methanol, then dried in a vacuum oven. The yields of dry polymer are shown below. Aliquots of polymers were placed in an extraction apparatus, and were extracted with hot benzene. The intrinsic viscosities of the soluble portion of the polymers are shown below.

|  | A | B | C | D |
|---|---|---|---|---|
| IrCl₃.4H₂O, g | 0.1 | 0.1 |  | 0.1 |
| (NH₄)₂IrCl₆, g |  |  | 0.5 |  |
| SnCl₂, g |  |  | 0.2 |  |
| EtOH, ml |  |  | 5 | 20 |
| 5-carbomethoxy norbornene, g |  |  | 20 | 5 |
| Norbornene, g | 5 | 5 |  |  |
| Sodium dodecyl benzene sulfonate, g | 0.5 | 0.5 | 2.5 | 1.0 |
| Pluronic F-68, g |  |  |  | 1.0 |
| H₂O, ml | 20 | 20 | 100 | 3 |
| Reaction time, hours | 18.8 | 18.8 | 19.8 | 66 |
| Yield of polymer, g | 0 | 1.7 | 4.08 | 2.94 |
| Percent extracted by hot benzene |  | 39 | 100 | 56 |

Example 4

This example illustrates the preparation of polymer from 5-carbomethoxy norbornene using as reducing agents, ethanol, stannous chloride, zinc metal, and zinc metal with acetic acid. The following recipes were made in glass tubes, which were then sealed and placed on a 50° bath for 18.2 hours. The tubes were removed, and the polymer was obtained as in Example 3.

|  | A | B | C | D | E |
|---|---|---|---|---|---|
| IrCl₃.4H₂O, g | 0.1 | 0.1 | 0.1 | 0.1 | 0.1 |
| 5-carbomethoxy norbornene, g | 0.5 | 0.5 | 0.5 | 0.5 | 0.5 |
| Sodium dodecyl benzene sulfonate, g | 0.5 | 0.5 | 0.5 | 0.5 | 0.5 |
| H₂O, ml | 20 | 20 | 20 | 20 | 20 |
| Reducing agent | (¹) | (²) | (³) | (⁴) | (⁵) |
| Polymer yield, g | 0 | 0.4965 | 0.1360 | 0.1525 | 1.8531 |

¹ None.
² 5 ml. EtOH.
³ 0.2 g. SnCl₂.
⁴ 0.5 g. Zn.
⁵ 0.5 g. Zn plus 5 ml. glacial HOAc.

Example 5

This example shows the preparation of high molecular weight carbomethoxy norbornene in stable emulsion, and lists physical properties of the polymer. The following recipes were prepared in bottles which were then capped. The bottles were agitated on a 50° bath for the time specified. The stable emulsion was precipitated by pouring into methanol containing small amounts of N-phenyl-beta-naphthylamine. The polymer was filtered and washed several times, then dried in a vacuum oven. The yields of dry polymer are shown below.

|  | A | B |
|---|---|---|
| (NH₄)₂IrCl₆, g | 1.0 | 1.0 |
| H₂O, ml | 200 | 100 |
| Pluronic F-68, g | 10 |  |
| n-Butyraldehyde, g | 5 |  |
| 5-carbomethoxy norbornene, g | 50 | 55 |
| Reaction time, hours | 48.4 | 65.0 |
| Polymer yield, g | 21.2 | 23.5 |

From each sample, a 1 g. aliquot portion was placed in an extraction apparatus and extracted by hot benzene.

|  | A | B |
|---|---|---|
| Weight of sample, 1 g | 1.00 | 1.00 |
| Extraction time, d | 1 | 1 |
| Weight of sample extracted into benzene, g | 0.57 | 0.86 |

The polymer not used for the extraction from both Sample A and Sample B was combined. The polymer was molded in a press at 375° F. The molded piece showed the following physical properties:

| Tensile (avg. of three) room temperature | 4,315 |
|---|---|
| Torsional modulus, room temperature | 132,900 |
| Hardness, Rockwell R | 93 |
| Notched izod impact (duplicates) | 1.63, 1.03 |

Example 6

This example lists the preparation of polymer employing RuCl₃, K₂IrCl₆, and IrBr₃ as the catalysts. The following recipes were made up as in Example 1 and reacted for the hours specified at 50° C. Yields of dry polymer are shown:

|  | A | B | C | D | E |
|---|---|---|---|---|---|
| IrBr₃, g | 0.1 | 0.5 | | | |
| K₂IrCl₆, g | | | 0.5 | | |
| RuCl₃, g | | | | 0.25 | 0.25 |
| H₂O, ml | 5 | | | | 10 |
| EtOH, ml | 20 | 20 | 100 | 20 | 100 |
| Norbornene, g | 5 | 5 | 10 | 5 | 25 |
| Reaction time, hours | 16.4 | 16.4 | 89.7 | 15.9 | 113.7 |
| Yield of polymer, g | 4.58 | 4.82 | 9.2 | 0.85 | 2.79 |

Example 7

This example includes formation of polymer from a variety of substituted norbornenes. The reactions were all conducted in glass bottles which were then sealed and then agitated on a bath maintained at the temperature specified for the number of hours specified. The polymers were poured into methanol, filtered, then washed several times. The polymers were dried in vacuum to constant weight. The dry yields of polymer are shown. In run H, there is an alcohol group in the monomer, which serves as the reducing agent.

|  | A | B | C | D | E | F |
|---|---|---|---|---|---|---|
| IrCl₃.4H₂O, g | 0.25 | 0.25 | 0.25 | 0.25 | 0.25 | |
| K₂IrCl₆, g | | | | | | 0.5 |
| H₂O, ml | 3 | 3 | 3 | 3 | 3 | 15 |
| EtOH, ml | 20 | 20 | 20 | 20 | 20 | 2 |
| 5-phenylnorbornene-2, g | 2 | | | | | |
| trans-5-6-dichlorobicyclo[2.2.1]-hept-2-ene, g | | 2 | | | | |
| Exo-dicyclopentadiene, g | | | 2 | | | |
| Endo-cis-5-6-dichlorobicyclo-[2.2.1]-hept-2-ene, g | | | | 2 | | |
| 5-methylene-norbornene-2, g | | | | | 2 | |
| 2-norbornene-5-carboxylic acid, g | | | | | | 5 |
| Reaction time, hours | 17.4 | 22.4 | 17.6 | 17.6 | 17.6 | 42.4 |
| Reaction temp., ° C | 50 | 50 | 50 | 50 | 50 | 50 |
| Polymer yield, g | 2.2 | 0.19 | 2.0 | 0.14 | 0.37 | 2.9 |

|  | G | H | I | J | K | L | M |
|---|---|---|---|---|---|---|---|
| IrCl₃.4H₂O, g | 0.25 | | 0.05 | 0.1 | | | 0.1 |
| K₂IrCl₆, g | | 0.1 | | | | | |
| (NH₄)₂IrCl₆, g | | | | | 0.1 | 0.1 | |
| Sodium dodecylbenzene sulfonate, g | | 0.5 | | | | | |
| Pluronic F-68, g | | | | | 0.5 | 0.5 | 0.5 |
| H₂O, ml | 3 | 20 | 3 | 1 | 10 | 20 | 20 |
| EtOH, ml | 20 | | 20 | 10 | | | |
| n-butyraldehyde, ml | | | | 0.2 | 0.5 | 0.5 | |
| 5-methyl-5-carbomethoxy-2-norbornene, g | | | | 1 | 1 | 5 | |
| trans-dimethyl bicyclo-[2.2.1]-hept-5-ene 2,3-dicarboxylate, g | | | | | | | 1 |
| 2-hydroxymethyl-5-norbornene, g | 2 | 5 | | | | | |
| Exo,dihydro dicyclopentadiene, g | | | 2 | | | | |
| Reaction time, hours | 17.6 | 77.0 | 18.4 | 69.2 | 69.2 | 66 | 18.2 |
| Reaction temp., ° C | 50 | 50 | 50 | 50 | 50 | 50 | 50 |
| Polymer yield, g | 1.6 | 0.42 | 0.92 | 0.10 | 0.19 | 0.10 | 0.16 |

Having thus described my invention, what I claim and desire to protect by Letters Patent is:

1. A method of polymerizing an olefinically unsaturated organic compound containing at least one carbon-carbon double bond in a bicyclo[2.2.1]-hept-2-ene ring system comprising contacting said compound in aqueous emulsion with a compound of a metal selected from the group consisting of iridium and ruthenium and a reducing agent of sufficient reducing strength to activate said metal compound.

2. A method as in claim 1, in which the emulsion is effected by an emulsifier selected from the group consisting of anionic and non-ionic emulsifiers.

3. A method as in claim 1 in which the organic compound is selected from the group consisting of (a) mono-substituted norbornenes, (b) disubstituted norbornenes, (c) halogenated norbornenes, and (d) norbornene, devoid of nitrilo, nitro, amino, amido, hydrazino and hydrazido groups, other than bicyclo[2.2.1]-hepta-2,5-diene and endo-dicyclopentadiene.

4. A method as in claim 1 in which the organic compound is selected from the group consisting of 5-carbomethoxynorbornene,
5-phenyl-2-norbornene,
2-norbornene-5-carboxylic acid,
2-hydroxymethyl-5-norbornene,
exo-dicyclopentadiene,
5-methyl-5-carbomethoxy-2-norbornene,
trans-dimethyl bicyclo[2.2.1]-hept-5-ene-2,3-dicarboxylate,
exo-dihydrodicyclopentadiene,
trans-5,6-dichlorobicyclo[2.2.1]-hept-2-ene,
endo-cis-5,6-dichlorobicyclo[2.2.1]-hept-2-ene, and norbornene.

5. A method as in claim 1, in which the metal compounds are halides.

6. A method as in claim 1 in which the said reducing agent is selected from the group consisting of aliphatic alcohols of at least two carbon atoms, aldehydes, free metals between and including tin and magnesium in the electromotive series, sodium borohydride, and stannous salts.

7. A method as in claim 1 in which the said reducing agent is selected from the group consisting of ethanol, butyraldehyde, free metals between and including tin and magnesium in the electromotive series, sodium borohydride, and stannous chloride.

8. A method of polymerizing a monomer selected from the group consisting of 5-carbomethoxynorbornene,
5-phenyl-2-norbornene,
2-norbornene-5-carboxylic acid,
2-hydroxymethyl-5-norbornene,
exo-dicyclopentadiene,
5-methyl-5-carbomethoxy-2-norbornene,
trans-dimethyl bicyclo[2.2.1]-hept-5-ene-2,3 dicarboxylate,
exo-dihydrodicyclopentadiene,
trans-5,6-dichlorobicyclo[2.2.1]-hept-2-ene,
endo-cis-5,6-dichlorobicyclo[2.2.1]-hept-2-ene, and norbornene comprising contacting said monomer with a catalyst selected from the group consisting of iridium trihalides, ruthenium trihalides, dipotassium iridium hexachloride and diammonium iridium hexachloride, and a reducing agent selected from the group consisting of ethanol, butyraldehyde, free metals between and including tin and magnesium in the electromotive series, sodium borohydride, and stannous chloride, the molar ratio of reducing agent to catalyst being at least one, in an aqueous emulsion with an emulsifying agent selected from the group consisting of anionic and non-ionic emulsifying agents.

9. A method as in claim 1 in which the monomer is 5-carbomethoxynorbornene.

10. A method as in claim 1 in which the monomer is 5-methyl-5-carboxymethoxy-2-norbornene.

11. A method as in claim 1 in which the monomer is trans-dimethyl bicyclo[2.2.1]-hept-5 - ene - 2,3 - dicarboxylate.

12. Poly(5-carbomethoxynorbornene).

References Cited

F. W. Michelotti and W. P. Keaveney, ACS Polymer Preprints, vol. 4, #2, #P293, September 1963.

JOSEPH L. SCHOFER, *Primary Examiner.*

L. EDLEMAN, *Assistant Examiner.*